United States Patent [19]

Dimmig

[11] 4,039,595

[45] Aug. 2, 1977

[54] COPOLYMERS OF ETHYLENE AND HEXAFLUOROPROPENE

[75] Inventor: Daniel Ashton Dimmig, King of Prussia, Pa.

[73] Assignee: Pennwalt Corporation, Philadelphia, Pa.

[21] Appl. No.: 587,947

[22] Filed: June 16, 1975

[51] Int. Cl.² ............................................. C08F 14/28
[52] U.S. Cl. ........................... 260/653.1 R; 260/648 F
[58] Field of Search ...................... 260/653.1 R, 648 F

[56] References Cited

U.S. PATENT DOCUMENTS

| 2,549,935 | 4/1951 | Sauer | 526/254 |
|---|---|---|---|
| 2,598,283 | 5/1952 | Miller | 260/653.1 R |
| 3,406,210 | 10/1968 | Schmerling | 260/653.1 R |
| 3,911,035 | 10/1975 | Lalande, Jr. et al. | 260/653.1 R |

FOREIGN PATENT DOCUMENTS

| 9,083,789 | 8/1974 | Japan | 260/653.1 R |

*Primary Examiner*—Delbert E. Gantz
*Assistant Examiner*—J. Thierstein

[57] ABSTRACT

Copolymers of ethylene and hexafluoropropene (HFP) containing between about 15 mol percent and 50 mol percent HFP comprising low to intermediate molecular weight oils of high viscosity. The copolymers are prepared in the presence of a free radical initiator at autogenous pressure at a temperature ranging from 20° C. to 80° C.

10 Claims, No Drawings

COPOLYMERS OF ETHYLENE AND HEXAFLUOROPROPENE

BACKGROUND OF THE INVENTION

A. Field of the Invention

This invention relates to novel copolymers of ethylene and hexafluoropropene (HFP) containing 15 mol percent to 50 mol percent HFP and methods for preparing the same. The copolymers of this invention are highly viscous oils having little tendency to flow at ambient temperatures and are characterized by having low to intermediate molecular weight. This invention relates further to the preparation of the copolymers of this invention by polymerizing ethylene and HFP in the presence of a source of free radicals under relatively mild reaction conditions in a medium comprised of a perfluoroalkane or perfluorochloroalkane liquid, or a mixture of one or more of said perhaloalkanes with water.

B. Description of the Prior Art

It is well known in the prior art that HFP cannot be homopolymerized in a free radical system without the use of prohibitively high pressures. In addition, the free radical initiated polymerization of ethylene requires high pressure (5,000 to 10,000 psi). The copolymerization or terpolymerization of HFP with other fluoroolefins; e.g. tetrafluoroethylene, vinylidene fluoride and chlorotrifluoroethylene is known and a number of these polymers have gained importance commercially; see for example U.S. Pat. No. 3,787,379. On the other hand, the copolymerization of HFP with non-fluorine-containing monomers has received little attention.

Copolymers of HFP with non-fluorine-containing olefins and vinyl monomers are disclosed in U.S. Pat. No. 2,549,935; in Example 4 of which, a monomer mixture containing approximately 4 mol percent HFP and 96 mol percent ethylene was polymerized in the presence of water at 70° C with lauroyl peroxide for 9.5 hours. A pressure in the range of 8,400 to 8,800 psi was maintained throughout the polymerization by injection of water resulting in an 8% yield of copolymer containing 10 mol percent HFP.

Adams et al., J. Polymer Sci., IX (6), 481–492 (1952) reported an HFP/ethylene copolymer containing 8 mol percent HFP obtained in 26% yield in a 4-hour emulsion polymerization with potassium persulfate at 80° C and 5100 psi. The copolymer was reported to be rubbery and weak as well as low in molecular weight.

The information available from U.S. Pat. No. 2,549,935 and the Adams et al. publication indicates that high pressures must be used in order to polymerize a mixture of ethylene and HFP, and even when such high pressures are utilized, low yields of such copolymers are obtained containing relatively low amounts of HFP incorporated therein. On the other hand, U.S. Pat. No. 3,817,951 discloses low-modulus thermoplastic ethylene/tetrafluoroethylene (TFE)/HFP terpolymers containing between 40 and 60 mol percent ethylene, between 20 and 30 mol percent TFE and between 10 and 30 mol percent HFP. The products of the present invention are distinguishable from U.S. Pat. No. 3,817,951 in several respects. In the first place, the polymers of the patent are terpolymers, whereas those of the present invention are copolymers. The polymers of the patent contain TFE, which, as is well known, can be homopolymerized in the presence of a free radical source, whereas HFP cannot be under the conditions of the patent. Moreover, the terpolymers of the reference are solids, whereas the copolymers of this invention are low to intermediate molecular weight oils having high viscosity. Furthermore, the patent does not contemplate a polymer containing more than 30 mol percent HFP.

Japanese Patent Publication J4 9083-789, published August 12, 1974, discloses copolymers containing ethylene and 11 to 50 mol percent HFP prepared at 90° to 300° C at pressures of 800 to 4000 kg/square cm. (approximately 11000 to 57000 psi) to provide a vulcanizable product.

DETAILED DESCRIPTION OF THE INVENTION

A. In General

One of the objects of this invention is to provide novel copolymers of ethylene and HFP containing between 15 and 50 mol percent HFP.

Another object of this invention is to provide a copolymer in the form of a low to intermediate molecular weight high viscosity oil.

Yet another object of this invention is to provide a copolymer consisting essentially of 85 mol percent to 50 mol percent ethylene and 15 mol percent to 50 mol percent HFP, preferably 75 mol to 55 mol percent ethylene and 25 mol percent to 45 mol percent HFP.

An additional object of this invention is to provide a process for the preparation of such ethylene/HFP copolymers at moderate temperatures and low pressures in a reaction medium containing significant amounts of a liquid perfluoroalkane or perfluorochloroalkane, the polymerization reaction being initiated by an appropriate source of free radicals.

The foregoing objects are achieved according to this invention by polymerizing ethylene and HFP in a liquid reaction medium comprised of a perfluoroalkane or perfluorochloroalkane, or a mixture of one or more of said perhaloalkanes with water at a temperature in the range between 20° C and 80° C at autogenous pressure. Preferably, the temperature ranges between 30° C and 60° C. Autogenous pressure under such conditions will generally be between 100 and 1000 psi, preferably between 200 and 600 psi. The proportion of liquid reaction medium (i.e., one or more of said perhaloalkanes with or without water) to monomers is in the range of between 1:1 and 10:1, preferably between 3:1 and 6:1, on a weight ratio. The proportion of water to perhaloalkane generally is found in the range of between 0 and 5:1, preferably 3:1 to 5:1.

A variety of liquid perfluoroalkanes or perchlorofluoroalkanes may be used; e.g. trichlorotrifluoroethane, dichlorotetrafluoroethane, tetrachlorodifluoroethane, trichlorofluoromethane, perfluorocyclobutane, and perfluoro-1,3-dimethylcyclobutane.

A variety of compounds known to provide free radicals may be used according to this invention, particularly ones such as peroxides having a ten-hour half-life between 0° and 50° C. Such compounds include for example, dialkylperoxydicarbonates, such as diisopropylperoxydicarbonate (10-hour half-life of 46° C), di(sec-butyl)peroxydicarbonate (45° C), di(2-ethylhexyl)peroxydicarbonate (42° C.) as well as acyl peroxides such as isobutyryl peroxide (34° C), 2-methylpentanoyl peroxide (28° C.), perfluoropropionyl peroxide (30° C).

Although, as indicated, the concentration of hexafluoropropene in the copolymer should be 15 mol percent or greater, the theoretical maximum concentration of hexafluoropropane would be 50 mol percent, as HFP cannot react with itself under the conditions contemplated by this invention. A copolymer of ethylene and HFP containing 50 mol percent represents an alternating copolymer of ethylene and HFP. As one approaches the extremes in the general range of HFP content, conversions and yields may be lower. Consequently, in practice, copolymers containing between about 25 mol percent and 45 mol percent HFP may be advantageous. The mol percent HFP in the monomer feed is not directly proportional to the mol percent HFP in the ethylene/HFP copolymer. In general, the monomer feed should contain between about 10 mol percent and about 75 mol percent HFP, preferably between about 30 and 50 mol percent HFP.

The copolymers of this invention may be used as plasticizers for fluoroelastomers, as extenders for non-fluorine-containing polymers, as dielectric fluids and as additives for lubricant formulations. Although these copolymers are liquids, their molecular weight and viscosity are such that they are not as fugitive in nature as monomeric materials are that are used for the same purposes. Moreover, their halogen content is advantageous from a flammability standpoint when compared to known materials used for these purposes which are both low molecular weight and non-halogen-containing. These copolymers are soluble in liquid perfluoroalkanes and perfluorochloroalkanes.

ILLUSTRATIVE EMBODIMENTS OF THE INVENTION

EXAMPLE 1

A stainless steel pressure reactor is charged with 580 parts of 1,1,2-trichloro-1,1,2-trifluoroethane, 1,570 parts of oxygen-free water, and 6.2 parts of diisopropyl peroxydicarbonate. The reactor is closed, evacuated and charged with 370 parts of hexafluoropropene and 90 parts of ethylene. The reaction mixture is stirred and heated to 50° C., resulting in an autogenous pressure of 350 psig. After 29 hours, at a pressure of 210 psig, the reactor is cooled to ambient temperature, the unreacted portion of the gaseous monomers is bled off and the reactor is discharged. The organic phase is separated in a separating funnel, concentrated by flash evaporation at reduced pressure, and finally freed of volatiles by vacuum treatment at an elevated temperature. The amount of copolymer obtained, in the form of a clear highly-viscous oil, is 184 parts. The copolymer contains 46.01% fluorine corresponding to 34 mole% (74 wt. %) of hexafluoropropene and 66 mole % of ethylene. The copolymer is soluble in 1,1,2-trichloro-1,2,2-trifluoroethane and acetone. The inherent viscosity is 0.18 dl/g. (0.5g of polymer in 100 ml. of 1,1,2-trichloro-1,2,2-trifluoroethane at 30° C.) Thermogravimetric analysis of this copolymer showed a 5% weight loss in nitrogen at 355° C. and a 5% weight loss in air at 270° C.

The Thermogravimetric procedure is as follows:

A 5 to 7 mg. sample of the polymer is heated at the rate of 5° centigrade per minute with a corresponding gas flow of 200 cc/min. A trace of temperature vs. weight loss is obtained and the desired data read from the chart. Values reflect relative thermal stability of a polymer.

EXAMPLE 2

Following the procedures of Example 1, 227 parts of ethylene and 135 parts of hexafluoropropene are copolymerized at 30° C. for 25 hours followed by an additional 26 hours at 40° C., maximum pressure 545 psig, in a medium comprised of a mixture of 1570 parts of deoxygenated water and 530 parts of 1,1,2-trichloro-1,2,2-trifluoroethane containing 4 parts diisopropyl peroxydicarbonate initiator to yield 100 parts of a copolymer. The clear viscous copolymer contained 23 mole % hexafluoropropene and exhibited an inherent viscosity of 0.26 dl/g. This example illustrates a temperature lower than 50° C and also a low concentration of hexafluoropropene in the monomer feed mixture.

EXAMPLE 3

Following the procedure of Example 1, 56 parts ethylene and 302 parts hexafluoropropene are copolymerized at 50° C. for 22 hours, maximum pressure 365 psig, in a mixture of 1200 parts of deoxygenated water and 1190 parts of 1,1,2-trichloro-1,2,2-trifluoroethane, containing 7 parts of diisopropyl peroxydicarbonate initiator to yield 72 parts of copolymer. The copolymer, in the form of a thick oil, contains 40 mol percent HFP. In Examples 1 to 3, parts are by weight

CONTROL A

A stainless steel pressure reactor is charged with 50 parts of oxygen-free water and 0.7 parts of di-t-butyl peroxide. The reactor is cooled to −20°, closed, evacuated, and charged with 79 parts of HFP and 17 parts of ethylene. The mixture is heated, with agitation, to a temperature of 120° C. over a period of 1½ hours. The autogenous pressure is observed to be 1100 psig. The temperature is maintained in the range of 120°-130° C. for an additional 4 hours with no change in pressure observed. The reactor is cooled to ambient temperature, the unreacted portion of the monomers is bled off, and the reactor is discharged. No evidence of polymerization is observed.

CONTROL B

A stainless steel pressure reactor is charged with 2400 parts of cold, oxygen-free water, 5.5 parts of trisodium phosphate, 1.2 parts of ammonium perfluorononanoate, 0.006 part of cupric sulfate, 4.6 parts of sodium bisulfite, and 5.0 parts of ammonium persulfate. The reactor is closed, evacuated, and charged with 310 parts of hexafluoropropene and 59 parts of ethylene. The mixture is agitated and heated to 70° C. After 5½ hours at 70° C., the autogenous pressure shows no change from 550 psig. The reactor is cooled, the unreacted gases bled off and the reactor is discharged. No evidence of polymerization is observed.

As shown in Control A the copolymerization of ethylene and hexafluoropropene was attempted in the vapor phase at 120°-130° C. with di-t-butyl peroxide as the initiator at an autogenous pressure of 1100 psig. No polymerization was observed. In addition, no polymerization was observed with a redox recipe at 70° C. and 550 psig with ammonium persulfate and sodium bisulfite as the redox pair in Control B. In contrast, copolymerization of ethylene and hexafluoropropene proceeded quite satisfactorily according to the invention herein; e.g. in Example 1 hereof, a copolymer containing 66 mol percent ethylene and 34 mol percent HFP was obtained in a 40% yield at a maximum pressure of 350 psig. The relatively facile copolymerization of ethylene and hexafluoroethylene with relatively high concentrations of HFP present in the copolymer under such mild conditions, especially the low pressure, is considered novel and unobvious in view of the prior art.

What is claimed is:

1. A highly viscous oil having little tendency to flow at ambient temperature and characterized by having low to intermediate molecular weight consisting essentially of copolymerized units of 85 mol percent to 50 mol percent ethylene and 15 mol percent to 50 mol percent hexafluoropropene, the copolymer being soluble in liquid perfluoroalkanes and liquid perfluorochloroalkanes.

2. The copolymer of claim 1 wherein the ethylene content is 75 mol percent to 55 mol percent and the hexafluoropropene content is 25 mol percent to 45 mol percent.

3. The copolymer of claim 1 wherein the ethylene content is between 77 mol percent and 60 mol percent and the hexafluoropropene content is between 23 mol percent and 40 mol percent.

4. A process for preparing the copolymers of claim 1 which comprises copolymerizing ethylene and hexafluoropropene at a temperature in the range of between 20° C. and 80° C. at autogenous pressure in liquid phase reaction medium comprised of a liquid perfluoroalkane or a liquid perfluorochloroalkane, or a mixture of one or more of said perhaloalkanes with water, in the presence of a peroxide having a 10 hour half-life temperature between 0° and 50° C. and which provides free radicals.

5. The process of claim 4 wherein a pressure is used between 100 and 1000 psi.

6. The process of claim 5 wherein said pressure is between 200 and 600 psi.

7. The process of claim 4 wherein the water: perhaloalkane ratio is in the range between 0 and 5:1.

8. The process of claim 7 wherein said ratio is in the range between 3:1 and 5:1.

9. The process of claim 4 wherein said peroxide which provides free radicals is selected from the dialkylperoxydicarbonates and the acyl peroxides.

10. The process of claim 9 wherein said peroxide is selected from diisopropylperoxydicarbonate, di(sec-butyl)peroxydicarbonate, di(2-ethylhexyl)peroxydicarbonate, isobutyryl peroxide, 2-methylpentanoyl peroxide, and perfluoropropionyl peroxide.